United States Patent [19]
Arashiro et al.

[11] Patent Number: 5,242,990
[45] Date of Patent: Sep. 7, 1993

[54] THERMOPLASTIC RESIN COMPOSITION

[75] Inventors: Yusuke Arashiro; Haruo Ohmura; Michiharu Kihira, all of Mie, Japan

[73] Assignee: Mitsubishi Petrochemical Co., Ltd., Tokyo, Japan

[21] Appl. No.: 744,129

[22] Filed: Aug. 13, 1991

[30] Foreign Application Priority Data

Aug. 14, 1990 [JP] Japan .................. 2-213676
Nov. 13, 1990 [JP] Japan .................. 2-303949

[51] Int. Cl.$^5$ .................. C08F 283/08; C08L 71/12; C08L 81/04
[52] U.S. Cl. .................. 525/396; 525/537; 525/905
[58] Field of Search .................. 525/396, 537, 905

[56] References Cited

U.S. PATENT DOCUMENTS

| | | | |
|---|---|---|---|
| 4,528,346 | 7/1985 | Sugie et al. | 525/537 |
| 5,026,764 | 6/1991 | Okabe et al. | 525/395 |
| 5,028,656 | 7/1991 | Okabe et al. | 525/395 |
| 5,128,421 | 7/1992 | Ohmura et al. | 525/390 |

FOREIGN PATENT DOCUMENTS

| | | | |
|---|---|---|---|
| 0341421 | 11/1989 | European Pat. Off. | 525/396 |
| 0341422 | 11/1989 | European Pat. Off. | 525/396 |

Primary Examiner—James J. Seidleck
Assistant Examiner—Thomas Hamilton, III
Attorney, Agent, or Firm—Sughrue, Mion, Zinn, Macpeak & Seas

[57] ABSTRACT

A thermoplastic resin composition comprising (a) from 10 to 90% by weight of polyphenylene sulfide and (b) from 10 to 90% by weight of hydroxyalkylated polyphenylene ether which exhibits improved compatibility between components (a) and (b) and provides molded articles having characteristics inherent to polyphenylene sulfide and polyphenylene ether, i.e., excellent mechanical strength, excellent rigidity, and good appearance.

2 Claims, No Drawings

THERMOPLASTIC RESIN COMPOSITION

FIELD OF THE INVENTION

This invention relates to a resin composition comprising polyphenylene sulfide and hydroxyalkylated polyphenylene ether, and more particularly to a thermoplastic resin composition which provides molded articles with excellent mechanical strength, thermal rigidity, and appearance and is useful as an excellent industrial material.

BACKGROUND OF THE INVENTION

Polyphenylene sulfide (hereinafter abbreviated as PPS) is known as a high-melting heat resistant resin with excellent fluidity, organic solvent resistance, electrical characteristics, and flame retardance. For use as a molding material, however, PPS has poor extrusion stability and has poor molding stability due to the low degree of polymerization reached. Further, the glass transition temperature of PPS is not very high and as a result PPS undergoes a considerable reduction in rigidity at high temperatures. Improvements in performance have been achieved by compounding PPS with inorganic fillers such as glass fiber, carbon fiber, talc, and silica. However, molded articles obtained from PPS compositions containing these types of inorganic fillers tend to suffer from deterioration of appearance or warpage.

On the other hand, polyphenylene ether (hereinafter abbreviated as PPE) is recognized as an engineering plastic with excellent heat resistance, dimensional stability, non-hygroscopicity, and electrical characteristics. However, PPE has poor moldability due to its low melt-flow characteristics and also has insufficient oil resistance and insufficient impact resistance.

Hence, various polymer blends containing PPS or PPE have hitherto been proposed in an attempt to provide a molding material in which the above-described drawbacks are compensated for while retaining their own advantages.

For example, blending PPE and PPS to improve moldability of PPE has been suggested as disclosed in JP-B-56-34032 (the term "JP-B" as used herein means an "examined published Japanese patent application"). However, a mere polymer blend, though exhibiting improved moldability, has poor affinity at the interface between the PPE and the PPS because these two resins are essentially incompatible with each other. As a result, the composition undergoes phase separation on molding, failing to provide molded articles having satisfactory mechanical strength.

In order to overcome the above-described problem of incompatibility between PPS and PPE, several proposals have been made to date. For instance, JP-A-59-164360 (U.S. Pat. No. 4,528,346) (the term "JP-A" as used herein means an "unexamined published Japanese patent application") suggests compounding an epoxy resin with a PPS/PPE blend, and JP-A-2-86652 (EP-A-360544) teaches compounding a PPS/PPE blend with an epoxy-containing styrene polymer. These proposed resin compositions achieve some improvement in compatibility between PPS and PPE but not to a sufficient degree, and the mechanical properties of the resulting molded articles are not regarded satisfactory.

It has also been proposed to modify PPE by introducing various functional groups to provide improved compatibility with PPS. For example, JP-A-64-36645 and JP-A-2-36261 (EP-A-341422) disclose compounds having an ethylenically unsaturated bond and an acid anhydride group in the same molecule, more specifically acid-modified PPE obtained by melt-kneading PPE with maleic anhydride. Further, JP-A-2-49023 (GB-A-2218996) discloses that the combined use of such acid-modified PPE and a polyisocyanate results in a further improvement in PPE/PPS compatibility. Furthermore, JP-A-1-259060 suggests that a combination of other modified PPE, specifically acid-modified PPE or hydroxyl-modified PPE obtained by melt-kneading PPE with hydroxyethyl acrylate, glycidyl methacrylate, etc., and functionalized modified PPS provides a resin composition having excellent mechanical strength. None of these proposals, nevertheless, is deemed to result in sufficient compatibility between PPE and PPS. A melted acid-modified PPE itself is not sufficiently compatible with PPS. Moreover, the techniques are accompanied by undesired problems. That is, modification by kneading in an extruder results in instability when drawing strands of the compound; or by-products which are unfavorable for performance of the final composition, such as an unreacted modifier and dissolved or insoluble gel of volatile low-molecular compounds including thermal decomposition products, must be removed. Therefore, development of a process for producing modified PPE having improved compatibility with PPS, while settling these problems, would make it possible to provide an excellent resin composition which meets the demands for high performance.

SUMMARY OF THE INVENTION

An object of the present invention is to provide a homogeneous thermoplastic resin composition comprising PPS and modified PPE having extremely high compatibility with PPS, where the composition provides molded articles with excellent appearance, mechanical strength and thermal rigidity.

Extensive investigations have been conducted with the above object in mind and, as a result, it has now been found that PPE whose terminal group is modified by a hydroxyalkyl group exhibits extremely good affinity to PPS. It is an utterly unexpected finding that PPE with a hydroxyalkyl group at the terminal thereof shows an affinity-improving interaction with PPS comprising a -Ph-S- (where Ph represents a phenyl group) skeleton and a -Ph-Cl terminal as main units of the polymer. Based on this finding, the performance of a resin composition comprising such a hydroxyalkylated PPE and PPS has been evaluated, and, it has now been proved that the composition fulfils the object of the present invention, and thus the present invention has been accomplished.

The present invention provides a thermoplastic resin composition comprising
 (a) from 10 to 90% by weight of PPS and
 (b) from 10 to 90% by weight of hydroxyalkylated PPE.

DETAILED DESCRIPTION OF THE INVENTION

PPS which can be used as component (a) (PPS(a)) is a crystalline resin mainly comprising a repeating unit represented by formula:

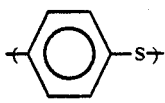

From the standpoint of physical properties such as heat resistance, PPS (a) to be used preferably is a homopolymer of the above-described repeating unit or a copolymer containing the repeating unit in a molar ratio of at least 80 mol %, and more preferably at least 90 mol %. Where PPS (a) is a copolymer, the comonomer unit other than the above-described unit present in a molar ratio of, e.g., up to 20 mol%, includes the following repeating units copolymerizable therewith.

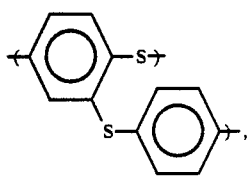

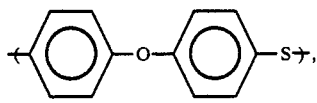

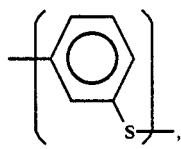

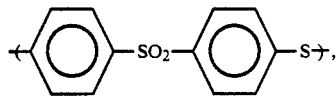

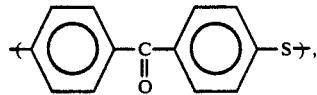

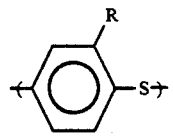

wherein R represents an alkyl group containing 1-12 carbon atoms, and preferably a lower alkyl group containing 1-6 carbon atoms.

From the standpoint of the physical properties of molded articles, PPS preferably has a linear structure. As long as the physical properties of molded articles are not substantially impaired, PPS containing a crosslinked structure, such as polymerization-crosslinked products prepared by conducting polymerization in the presence of an effective amount of a crosslinking agent (e.g., a trihalobenzene) and thermally crosslinked products prepared by heat treating a polymer in the presence of, e.g., oxygen, can also be employed.

PPS preferably has a melt viscosity at 300° C. of from 100 to 20,000 poise, and more preferably from 500 to 10,000 poise. If the melt viscosity is out of this range, too high or too low fluidity makes molding difficult.

PPS can be prepared by any process as long as the PPS produced meets the purpose. In particular, PPS satisfying the above-described preferred criteria can be prepared in accordance with the process described in JP-B-45-3368 (GB-A-1056226) in which polymers of relatively low molecular weight are produced, the process disclosed in JP-B-52-12240 (U.S. Pat. No. 3,919,175) in which linear polymers of relatively high molecular weight are produced, or a process in which a low-molecular weight polymer is heated in the presence of oxygen to obtain a crosslinked polymer, or above processes with necessary modifications.

If desired, PPS may be treated with hot water, etc. where a fibrous filler is used in combination.

Hydroxyalkylated PPE which can be used as component (b) is PPE obtained by adding an alcoholic hydroxyl group to the terminal phenolic hydroxyl group by reaction with a functionalizing agent. Hydroxyalkylated PPE (b) can be obtained by the process, for example, previously proposed by some of the inventors of the present invention which comprises reacting PPE with a functionalizing agent at a temperature of from 50° to 200° C. in the presence of a basic catalyst with or without an organic solvent capable of dissolving PPE.

The starting PPE is a homo- or copolymer having a repeating unit represented by formula (II):

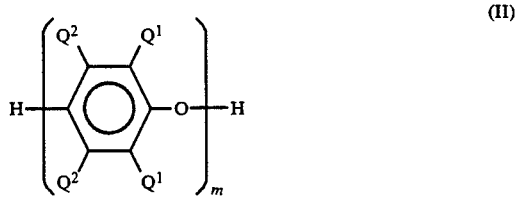

(II)

wherein $Q^1$ represents a halogen atom, a primary or secondary alkyl group, a phenyl group, an aminoalkyl group, a hydrocarbon oxy group, or a halo-hydrocarbon oxy group; $Q^2$ represents a hydrogen atom, a halogen atom, a primary or secondary alkyl group, a phenyl group, a haloalkyl group, a hydrocarbon oxy group, or a halo-hydrocarbon oxy group; and m represents a number of 10 or greater. In each of the units independently, the halogen atom or the halo-moiety can be exemplified by chlorine and bromine, and the alkyl group or the hydrocarbon moiety contains from 1 to 8 carbon atoms.

Examples of suitable primary alkyl groups as represented by $Q^1$ or $Q^2$ are methyl, ethyl, n-propyl, n-butyl, n-amyl, isoamyl, 2-methylbutyl, n-hexyl, 2,3-dimethylbutyl, 2-, 3- or 4-methylpentyl, and heptyl groups. Examples of suitable secondary alkyl groups as $Q^1$ or $Q^2$ are isopropyl, sec-butyl, and 1-ethylpentyl groups. $Q^1$ is in most cases an alkyl group or a phenyl group and, particularly, an alkyl group having from 1 to 4 carbon atoms. $Q^2$ is in most cases a hydrogen atom.

Suitable PPE homopolymers include a homopolymer comprising 2,6-dimethyl-1,4-phenylene ether units. Suitable phenylene ether copolymers include a random copolymer of 2,6-dimethyl-1,4-phenylene ether units and 2,3,6-trimethyl-1,4-phenylene ether units. Many examples of suitable PPE homopolymers or PPE random copolymers are described in patents and the literature (e.g., U.S. Pat. No. 3,306,874). PPE containing a molecular constituting segment for improving characteristics such as molecular weight, melt viscosity and-
/or impact strength are also suitable.

PPE to be used here usually has a molecular weight providing an intrinsic viscosity of from about 0.2 to about 0.8 dl/g in chloroform at 30° C.

PPE is generally prepared by the oxidative coupling of the above-mentioned phenylene ether monomer(s). A number of catalyst systems are known for use in oxidative coupling of phenylene ether monomers. Any known catalysts can be used in the present invention without any particular limitation. For example, combinations of at least one heavy metal compound of copper, manganese, cobalt, etc. with various other substances are used.

Hydroxyalkylated PPE species and functionalizing agents to be used for preparing the same are illustrated below through description of processes (A) to (E) for preparing hydroxyalkylated PPE.

Process (A) comprises reacting PPE of formula (II) with glycidol represented by formula (IIIA):

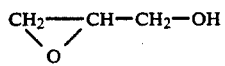
(IIIA)

to prepare hydroxyalkylated PPE represented by formula (IA):

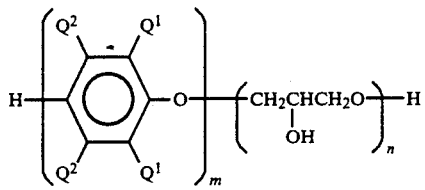
(IA)

wherein $Q^1$, $Q^2$, and m are as defined above; and n is a number of from 1 to 10.

Process (B) comprises reacting PPE of formula (II) with an epihalohydrin represented by formula (IIIB):

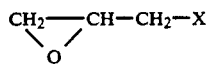
(IIIB)

wherein X represents a halogen atom, exemplified by chlorine and bromine, e.g., epichlorohydrin, and hydrolyzing the resulting glycidyl-terminated PPE to prepare hydroxyalkylated PPE represented by formula (IB):

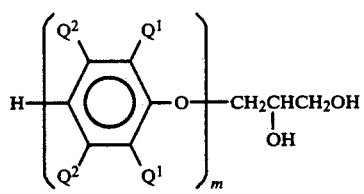
(IB)

wherein $Q^1$, $Q^2$, and m are as defined above.

Process (C) comprises reacting PPE of formula (II) with a halogenated alkyl alcohol represented by formula (IIIC)

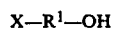
(IIIC)

wherein X is as defined above; and R represents an alkylene group having from 1 to 10 carbon atoms, e.g.,
2-chloroethanol or 3-chloro-1-propanol, to prepare hydroxyalkylated PPE represented by formula (IC):

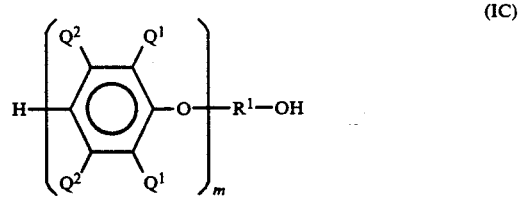
(IC)

wherein $Q^1$, $Q^2$, m, and $R^1$ are as defined above.

Process (D) comprises reacting PPE of formula (II) with an alkylene carbonate represented by formula (IIID):

(IIID)

wherein $R^2$ represents a hydrogen atom or an alkyl group having from 1 to 8 carbon atoms, e.g., ethylene oxide or propylene oxide, to prepare hydroxyalkylated PPE represented by formula (ID):

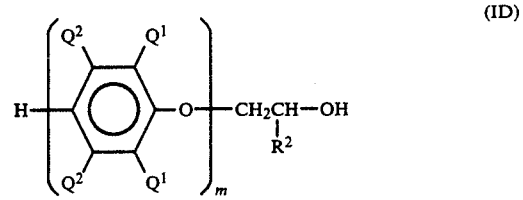
(ID)

wherein $Q^1$, $Q^2$, m, and $R^2$ are as defined above.

Process (E) comprises reacting PPE of formula (II) with an alkylene oxide represented by formula (IIIE):

(IIIE)

wherein $R^3$ represents a hydrogen atom or an alkyl group having from 1 to 8 carbon atoms, e.g., ethylene oxide or propylene oxide, to prepare hydroxyalkylated PPE represented by formula (IE):

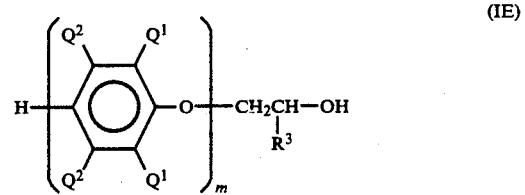
(IE)

wherein $Q^1$, $Q^2$, m, and $R^3$ are as defined above (JP-A-63-128021).

Examples of suitable organic solvents which may be used are aromatic hydrocarbons, e.g., benzene, toluene, and xylene; halogenated hydrocarbons, e.g., chloroform and carbon tetrachloride; halogenated aromatic hydrocarbons, e.g., chlorobenzene and dichlorobenzene; and heterocyclic compounds, e.g., N-methyl-2-pyrrolidone and 1,3-dimethyl-2-imidazolidinone.

Examples of suitable basic catalysts include alcoholates, e.g., sodium methoxide and sodium ethoxide; alkali metal hydroxides, e.g., sodium hydroxide and potassium hydroxide; and alkali metal carbonates, e.g., sodium carbonate and potassium carbonate.

In carrying out processes (A) to (E), the functionalizing agent is used in an amount of from 1 to 50 mols per mol of the terminal phenolic hydroxyl group of PPE. The basic catalyst is used in an amount of from 0.5 to 50 parts by weight per 100 parts by weight of PPE.

Of the above-described hydroxyalkylated PPE of formulae (IA) to (IE), preferred are those of formulae (IA) and (IB) which contain two or more alcoholic hydroxyl groups differing in reaction activity and reactivity, and particularly those of formula (IA).

If desired, hydroxyalkylated PPE may be used in combination with unmodified PPE. The mixing ratio of unmodified PPE to hydroxyalkylated PPE can be varied depending on the mixing ratio of component (b) to component (a). A suitable ratio of hydroxyalkylated PPE to unmodified PPE is usually from 100:0 to 20:80. If the proportion of hydroxyalkylated PPE is less than 20% by weight, the effect in improving compatibility is reduced.

The resin composition comprising components (a) and (b) may further contain (c) from 2 to 40 parts by weight of a thermoplastic elastomer per 100 parts by weight of the total of components (a) and (b). Incorporation of component (c) provides further improvement in impact strength of molded articles.

The thermoplastic elastomer (c) can be a polymer having a modulus of elasticity of not more than $10^9$ dyn/cm$^2$ at room temperature, including polyolefin type elastomers, diene type elastomers, polystyrene type elastomers, polyamide type elastomers, polyester type elastomers, polyurethane type elastomers, and fluorine type elastomers, with polyolefin type elastomers, diene type elastomers, and polystyrene type elastomers being preferably used.

Suitable examples of polyolefin type elastomers are polyisobutylene, an ethylene-propylene copolymers, an ethylene-propylene-diene copolymer, an ethylene-butene-1 copolymer; copolymers of ethylene and an organic acid ester, e.g., an ethylene-vinyl acetate copolymer, an ethylene-ethyl acrylate copolymer, and an ethylene-methyl acrylate copolymer; and various modification products of these olefin homo- or copolymers, e.g., an $\alpha,\beta$-unsaturated carboxylic acid anhydride-modified polymer, an unsaturated glycidyl ester or unsaturated glycidyl ether-modified polymer, a copolymer comprising an unsaturated epoxy compound and ethylene, a copolymer comprising an unsaturated epoxy compound, and a styrene polymer-grafted olefin polymer.

Examples of diene type elastomers include polybutadiene, polyisoprene; various modification products of these diene polymers; and styrene polymer-grafted diene polymers.

Examples of polystyrene type elastomers include random, graft or block copolymers comprising a vinyl aromatic compound and a conjugated diene; hydrogenation products of these polymers; and various modification products of these polymers. Of the copolymers of a vinyl aromatic compound and a conjugated diene, preferred are block copolymers, e.g., a styrene-butadiene block copolymers, a styrene-isoprene block copolymers, and a hydrogenation product thereof.

These elastomers may be used either individually or as a combination of two or more thereof.

If desired, the resin composition of the present invention may further contain other additives, such as antioxidants and weathering agents known for PPS or PPE; nucleating agents and flame retardants known for PPS; and plasticizers and fluidity improving agents known for PPE. Addition of organic or inorganic fillers or reinforcing materials, especially glass fiber, mica, talc, wollastonite, potassium titanate, calcium carbonate, or silica is effective to improve rigidity, heat resistance, and dimensional stability of the composition. To improve practical utility, known colorants and dispersing agents therefor can also be employed.

A thermoplastic resin composition comprising PPS (a) and hydroxyalkylated PPE (b) would have satisfactory compatibility between these two components in any mixing ratio. However, considering the balance between mechanical strength and organic solvent resistance, a mixing ratio of PPS (a) to hydroxyalkylated PPE (b) should range from 10:90 to 90:10, preferably from 20:80 to 80:20, and more preferably from 30:70 to 70:30, by weight. If component (a) is present in an amount less than 10% by weight, the composition has poor solvent resistance. If the amount exceeds 90% by weight, sufficient thermal rigidity cannot be obtained.

The thermoplastic elastomer (c) is usually added in an amount of from 2 to 40 parts by weight per 100 parts by weight of the total of PPS and hydroxyalkylated PPE. For obtaining a more satisfactory balance of mechanical properties, a preferred amount of component (c) is from 5 to 35 parts, and more preferably from 7 to 30 parts, by weight. If the proportion of component (c) is less than 2 parts, the effect of improving impact strength is decreased. If it exceeds 40 parts, heat resistance and rigidity are reduced, although impact resistance is improved.

The thermoplastic resin composition of the invention can be obtained by melt-kneading the above-described components according to kneading techniques commonly employed for general thermoplastic resins. For example, powdered or granular components are uniformly dry blended, if desired, together with necessary additives in a Henschel mixer, a ribbon blender, a twin-cylinder mixer, etc., and the resulting blend is melt-kneaded in a single-screw extruder, a multi-screw extruder, a roll, a Banbury mixer, etc.

Methods of molding the thermoplastic resin composition of the invention are not particularly restricted, and any molding techniques commonly employed for thermoplastic resins, such as injection molding, blow molding, extrusion molding, sheet molding, thermoforming, rotational molding, laminate molding, and press molding, can be employed.

The present invention is now illustrated in greater detail with reference to the following Preparation Examples, Examples, and Comparative Examples, but it should be understood that the present invention is not deemed to be limited thereto. All the parts, percents, ratios and the like are by weight unless otherwise indicated.

The following resin materials were used in the Examples and Comparative Examples.

PPS: Toprene T-4P (trade name of PPS produced by Toprene Co., Ltd.)

PPE: Poly(2,6-dimethyl-1,4-phenylene ether) experimentally prepared by Nippon Polyether K.K. whose intrinsic viscosity (30° C., chloroform) was 0.31 dl/g (designated PPE[η]=0.31) or 0.51 dl/g (designated PPE[η]=0.51).

Thermoplastic Elastomer

1. Hydrogenated styrene-butadiene-styrene copolymer "Kraton G-1651" (styrene content: 33%; produced by Shell Chemical Co., Ltd.) (abbreviated as SEBS).
2. Maleic anhydride-modified ethylene-propylene copolymer "T-7771Y" (230° C. MFR: 0.4 g/10 min; maleic anhydride content: 0.6%; produced by Nippon Synthetic Rubber Co., Ltd) (abbreviated as Mah-EPR).
3. Ethylene-glycidyl methacrylate copolymer "Bondfast-E" (190° C. MFR: 3 g/10 min; glycidyl methacrylate content: 10%; produced by Sumitomo Chemical Co., Ltd.) (abbreviated as E-GMA).
4. Ethylene-vinyl acetate copolymer "V-501H" (190° C. MFR: 2.5 g/10 min; vinyl acetate content: 20%; produced by Mitsubishi Petrochemical Co., Ltd.) (abbreviated as EVA).

PREPARATION EXAMPLE 1

Preparation of Hydroxyalkylated PPE (Modified PPE-1)

In 5 l of toluene was completely dissolved 500 g of PPE[η]=0.31 at 100° C. with stirring under a nitrogen atmosphere. To the resulting solution were added 75 g of sodium ethoxide as a catalyst and 500 ml of methanol, and 250 g of glycidol was added dropwise thereto over a 30 minute period. After the stirring had been continued at 100° C. for 7 hours, the reaction mixture was poured into 25 l of methanol to precipitate the hydroxyalkylated PPE produced. The precipitate was collected by filtration, washed twice with methanol, and dried at 80° C. under reduced pressure.

The resulting hydroxyalkylated PPE was designated modified PPE-1. The infrared absorption spectrum of modified PPE-1 showed an absorption assigned to a hydroxyl group in the vicinity of 3380 cm$^{-1}$. The reaction rate of the terminal phenolic hydroxyl groups of the starting PPE was found to be 90% as calculated from the terminal phenolic hydroxyl group contents before and after the reaction according to the method described in *Journal of Applied Polymer Science: Applied Polymer Symposium*, Vol. 34, pp. 103–117 (1978) (hereinafter the same).

PREPARATION EXAMPLE 2

Preparation of Hydroxyalkylated PPE (Modified PPE-2)

Modified PPE-2 was prepared in the same manner as for modified PPE-1, except for replacing PPE[η]=0.31 with PPE[η]=0.51. The reaction rate of the terminal phenolic hydroxyl groups was found to be 82%.

PREPARATION EXAMPLE 3

Preparation of Hydroxyalkylated PPE (Modified PPE-3)

Modified PPE-3 was prepared in the same manner as for modified PPE-2, except for replacing methanol with ethanol and the stirring had been continued for 5 hours after adding glycidol. The reaction rate of the terminal phenolic hydroxy groups was found to be 47%.

EXAMPLES 1 TO 5 AND COMPARATIVE EXAMPLES 1 TO 4

Resin components shown in Table 1 below were dry blended in the mixing ratio shown (total weight: about 50 g) and then melt-kneaded in a laboratory plastomill manufactured by Toyo Seiki Seisakusho at 310° C. and 60 rpm for 5 minutes. The resulting compound was ground to granule in a mill. The granular compound was press molded at 310° C. by means of a compression molding press manufactured by Toyo Seiki Seisakusho to prepare a 2 mm thick sheet. The sheet was cut to prescribed sizes to prepare samples for evaluation of various physical properties. Before evaluation, the samples were preserved in a desiccator for 2 to 6 days.

PPS used above had previously been dried in vacuo at 100° C. for 24 hours before use.

The physical properties of the samples and the appearance of a separately prepared molded article were measured and evaluated according to the following test methods. The results obtained are shown in Table 1 below.

1) Thermal Rigidity

Measurements of the temperature dependence of storage modulus (G') were made on 62 mm long, 12 mm wide and 2 mm thick samples at a frequency of 1 Hz at various temperatures by means of a mechanical spectrometer manufactured by Rheometric Co. The G' value at a measuring temperature of 150° C. was obtained.

2) Izod Impact Strength

Unnotched Izod impact strength at 23° C. was measured on three thicknesses of a 2 mm thick sample fixed together with cellophane tape by use of an Izod impact tester manufactured by Toyo Seiki Seisakusho according to JIS K7110.

3) Appearance of Molded Article

The above-prepared granular compound was injection molded at 310° C. using an injection molding machine "CS-183 MMX MINI MAX" manufactured by Custom Scientific Co. to prepare a 32 mm long, 6.2 mm wide and 3.2 mm thick sample. The appearance, mainly delamination, of the sample was observed and evaluated as follows.

Good . . . No problem for practical use
Medium . . . Needs improvement
Bad . . . Unsuitable for practical use 4) Dispersion State A piece cut out of the sample was subjected to ion etching, and the diameter of the dispersed particles was measured under a scanning electron micrograph "S-2400" manufactured by Hitachi, Ltd.

TABLE 1

|  | Example 1 | Example 2 | Example 3 | Example 4 | Example 5 | Compar. Example 1 | Compar. Example 2 | Compar. Example 3 | Compar. Example 4 |
| --- | --- | --- | --- | --- | --- | --- | --- | --- | --- |
| Composition (%): |  |  |  |  |  |  |  |  |  |
| Modified PPE-1 | 50 | — | 30 | 70 | 20 | — | — | — | — |

TABLE 1-continued

|  | Example 1 | Example 2 | Example 3 | Example 4 | Example 5 | Compar. Example 1 | Compar. Example 2 | Compar. Example 3 | Compar. Example 4 |
|---|---|---|---|---|---|---|---|---|---|
| Modified PPE-2 | — | 50 | — | — | — | — | — | — | — |
| PPE[$\eta$] = 0.31 | — | — | 50 | — | 10 | 50 | 100 | — | 80 |
| PPS | 50 | 50 | 20 | 30 | 70 | 50 | — | 100 | 20 |
| Physical Properties: |  |  |  |  |  |  |  |  |  |
| Thermal rigidity ($\times 10^9$ dyn/cm$^2$) | 5.0 | 4.0 | 6.8 | 6.2 | 3.3 | 4.6 | 8.0 | 1.5 | 6.6 |
| Unnotched Izod impact strength (kg · cm/cm$^2$) | 13 | 16 | 7.5 | 8.6 | 18 | 4.4 | 4.0 | 11 | 4.2 |
| Appearance | Good | Good | Good | Good | Good | Bad | — | — | Good |
| Dispersed particle diameter ($\mu$m) | 1-2 | 1-3 | 1-2 | 1-2 | 0.5-1.5 | >70 | — | — | 1-5 |

EXAMPLES 6 TO 8

The resin components shown in Table 2 below were dry blended in the mixing ratio shown (total weight: about 54 g) and then melt-kneaded in a laboratory plastomill manufactured by Toyo Seiki Seisakusho at 310° C. and 180 rpm for 5 minutes. The resulting compound was ground to granule in a mill. The granular compound was injection molded at 310° C. using an injection molding machine "CS-183 MMX MINI MAX" manufactured by Custom Scientific Co. to prepare samples for measurements of physical properties.

The physical properties and molded article appearance were measured and evaluated according to the following test methods. The results obtained are shown in Table 2 below.

1) Rigidity

Measurements of temperature dependence of storage modulus (E') were made on 47 mm long, 5.3 mm wide and 2.6 mm thick samples at a frequency of 1 Hz at various temperatures using a solid analyzer "RSA 2" manufactured by Rheometric Co. The E' values at measuring temperatures of 30° C. and 150° C. were obtained.

2) Izod Impact Strength

Unnotched Izod impact strength was measured on a 31.5 mm long, 6.2 mm wide, and 3.2 mm thick sample using an Izod impact tester "MINIMAX CS-138TI" manufactured by Custom Scientific Co.

3) Appearance of Molded Article:

The above-prepared granular compound was injection molded to prepare a 47 mm long, 5.3 mm wide and 2.6 mm thick sample. The appearance, mainly delamination, of the sample was observed and evaluated as follows.

Good . . . No problem for practical use
Medium . . . Needs improvement
Bad . . . Unsuitable for practical use

TABLE 2

|  | Example 6 | Example 7 | Example 8 | Example 9 | Example 10 | Example 11 |
|---|---|---|---|---|---|---|
| Composition (part): |  |  |  |  |  |  |
| PPS | 50 | 60 | 70 | 70 | 70 | 70 |
| Modified PPE-3 | 50 | 20 | 30 | 30 | 30 | 30 |
| PPE | — | 20 | — | — | — | — |
| SEBS | 15 | 12 | 9 | — | — | — |
| Mah-EPR | — | — | — | 9 | — | — |
| E-GMA | — | — | — | — | 9 | — |
| EVA | — | — | — | — | — | 9 |
| Physical Properties: |  |  |  |  |  |  |
| Rigidity: |  |  |  |  |  |  |
| 30° C. ($\times 10^{10}$ dyn/cm$^2$) | 1.6 | 1.7 | 1.8 | 1.65 | 1.6 | 1.65 |
| 150° C. ($\times 10^9$ dyn/cm$^2$) | 6.1 | 5.9 | 5.0 | 4.5 | 4.5 | 4.6 |
| Unnotched Izod impact strength (kg · cm/cm$^2$) | 37 | 33 | 34 | 28 | 30 | 25 |
| Appearance | Good | Good | Good | Good | Good | Good |

As is apparent from the results of the Examples and Comparative Examples above, the combined use of (a) PPS and (b) hydroxyalkylated PPE results in great reduction in dispersed particle size and improvement in compatibility between PPS and PPE which are essentially incompatible with each other. This thereby provides a thermoplastic resin composition capable of being used to produce molded articles having excellent characteristics attributed to both PPS and PPE, i.e., high rigidity and an excellent balance of mechanical strength. In addition, the incorporation of (c) a thermoplastic elastomer into the resin composition apparently improves impact resistance of the molded articles.

While the invention has been described in detail and with reference to specific examples thereof, it will be apparent to one skilled in the art that various changes and modifications can be made therein without departing from the spirit and scope thereof.

What is claimed is:

1. A thermoplastic resin composition comprising
   (a) from 10 to 90% by weight of polyphenylene sulfide and
   (b) from 10 to 90% by weight of hydroxyalkylated polyphenylene ether.

2. A thermoplastic resin composition as claimed in claim 1, wherein said hydroxyalkylated polyphenylene ether (b) is a polymer represented by the formula:

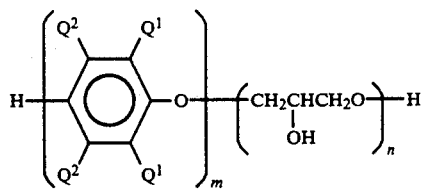

wherein $Q^1$ represents a halogen atom, a primary or secondary alkyl group, a phenyl group, an aminoalkyl group, a hydrocarbon oxy group, or a halo-hydrocarbon oxy group; $Q^2$ represents a hydrogen atom, a halogen atom, a primary or secondary alkyl group, a phenyl group, a haloalkyl group, a hydrocarbon oxy group, or a halo-hydrocarbon oxy group; m represents a number of 10 or greater; and n represents a number of from 1 to 10.

* * * * *